United States Patent Office 3,284,450
Patented Nov. 8, 1966

3,284,450
CYCLIZED o-CARBOXYBENZENESULFONIC ACID DERIVATIVES AND METHOD OF PREPARING THE SAME
Adriaan Kraaijeveld, Oegstgeest, and Antony M. Akkerman, Amsterdam, Netherlands, assignors to N.V. Nederlandsche Combinatie voor Chemische Industrie, Amsterdam, Netherlands, a limited-liability company of the Netherlands
No Drawing. Filed Sept. 16, 1963, Ser. No. 309,595
Claims priority, application Netherlands, Sept. 21, 1962, 283,525
7 Claims. (Cl. 260—243)

This invention relates to new cyclized o-carboxybenzenesulfonic acid derivatives and to a method of preparing the same.

A large number of diuretically active sulfamoyl derivatives of saccharin, partly represented by the formula:

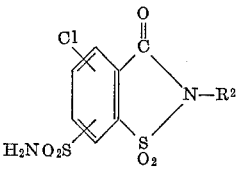

are described and claimed in U.S. Patent 2,957,883. In said patent the meaning of $R^2$ is defined as selected from the group consisting of hydrogen, a lower alkyl radical, a lower alkenyl radical, a phenyl-lower alkyl radical, a lower alkanoyl radical, a phenyl-lower alkanoyl radical, an omega-halo-lower alkyl radical, an omega-hydroxy-lower alkyl radical, an omega-(mono-lower-alkylamino)-lower alkyl radical, an omega-(di-lower alkylamino)-lower alkyl radical, an omega-piperidyl-lower alkyl radical, an omega-pyrrolidyl-lower alkyl radical, an omega-morpholinyl-lower alkyl radical, an omega-carboxy-lower alkyl radical, an omega carbalkoxy-lower alkyl radical, an omega-carboxy-lower alkanoyl radical, and an omega-carbalkoxy-lower alkanoyl radical.

From the many well-defined meanings given for $R^2$, one might conclude that this enumeration is limitative with regard to the diuretic properties of sulfamoyl derivatives of the type disclosed.

However, it has been found that compounds represented by the formula:

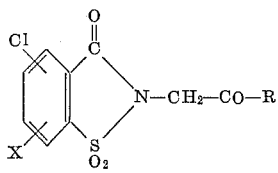

in which: R represents an alkyl radical or a whether or not substituted aryl, aralkyl, biphenylyl, cycloalkyl or cycloalkyl-alkyl radical having up to 12 carbon atoms, and X represents a hydrogen atom or a sulfamoyl substituent, are also valuable therapeutic agents, showing principally diuretic and/or saluretic properties. The diuretic activity especially comes to light in compounds having the sulfamoyl group.

Moreover it has been found that several of the new compounds are useful because of showing antihypertensive activity.

Correspondingly N-substituted saccharins, however, not having substituents in the benzene nucleus, are described by Kyuji Abe. Thus, N-phenacyl-saccharin is disclosed in Japanese patent 9681 (1958) (compare C.A. 54, 5575 e (1960)), whereas α-benzoylethyl-saccharin is mentioned in J. Pharm. Soc. Japan, 76, 1058 (1956).

In addition to the foregoing it has been found that the saccharin derivatives according to the invention can be converted by way of simple reactions in compounds represented by the formula:

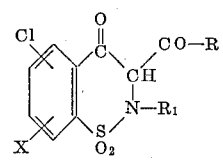

in which R and X have the above-defined meanings, and $R_1$ is a hydrogen atom or an alkyl, alkenyl, alkynyl, aralkyl or a keto-substituted alkyl or aralkyl radical, containing up to 9 carbon atoms. These compounds too are new, and they show pharmacological effects similar to those of the starting materials represented by Formula II. It has been found that, on the whole, the activity of the derivatives containing a six-membered ring is stronger than that of the five-membered saccharins. The compounds of the invention are of particular interest because of their low toxicity.

The new derivatives can be prepared by methods known per se for analogous compounds. Particularly suitable is the method comprising condensation of saccharin derivatives of the formula

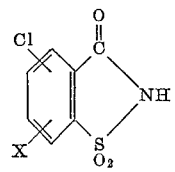

with a reactive ester of an alcohol HO—$CH_2$—COR, R and X having the above-defined meanings.

The saccharin derivatives thus obtained can be converted into the benzothiazinones of the Formula III on the analogy of a method reported by Kyuji Abe et al., J. Pharm. Soc. Japan, 76, 1058 (1956).

In this method the saccharin derivative is heated in alcohol with an excess of sodium alcoholate, whereupon the benzothiazinone formed is isolated. However, it has been found that it may be useful to perform the reaction in anhydrous solvents other than alcohol, such as dimethylformamide or pyridine. By doing so the yields tend to be increased, whereas purer products may be obtained.

If desired, the substituent $R_1$ can be introduced afterwards by usual methods.

Some of the compounds according to the present invention have been administered to test-animals, in order to determine the influence on the electrolyte and water excretion in the urine. At the same time the influence on the pH of the urine was examined. The results obtained are listed in Tables I and II; the values stated therein represent the mean differences in excretion between treated and control animals under the screening conditions. The electrolyte excretion is given in milliequivalents and the water excretion in milliliters both per kilogram body-weight of the tested animals.

In the last column the extent of rise or fall in the pH of the excreted urine is stated.

In order to compare the diuretic properties with those of a prior art compound, the same features are determined after the administration of an equal dose of chlorothiazide, a well known diuretic of the benzothiadiazine type. The following values have been found in this compound under the screening conditions for Na, K, Cl, $H_2O$ and pH, respectively: 1.4, 0.1, 1.6, 8, and −0.4.

The effects of the new compounds on blood pressure have been examined on experimentally hypertensive rats (Goldblatt rats). Hereby blood pressure is measured by the tail-plethysmometric method as described in Acta Phys. Pharm. Neerl. 3, 472 (1954).

Significant effects (i.e. a decrease in blood pressure of at least 10 mm. of mercury) have been observed in the compounds 2, 3, 4, 5, 7 and 8 of Table I and in the compounds 7, 9, 16, 17, 19 and 20 of Table II at an oral dosage of 40 mg./kg.

The following examples, which describe more exactly the preparation of some of the new compounds according to the invention, are only illustrative for the methods which can be used, and are not intended to limit the invention to the particular methods or compounds given.

With regard to the tables, it should be remarked that the derivatives mentioned therein are not stated for the purpose of limiting the invention either, but only to show the useful properties of compounds within the scope of the general formula.

EXAMPLE 1

*2-phenacyl-5-chloro-6-sulfamoyl-saccharin*

To a solution of 8 grams of 5-chloro-6-sulfamoyl-saccharin in 50 ml. of dimethylformamide are added 1.3 grams of a 50% suspension of sodium hydride in mineral oil. After completion of the reaction (the grains of sodium hydride then have disappeared and effervescence has ended), 5.4 grams of phenacyl bromide are added and the mixture is stirred for one hour at a temperature of 130° C. After cooling, the reaction mixture is poured into 250 ml. of water with stirring. The 5-chloro-6-sulfamoyl-2-phenacyl-saccharin precipitated is crystallized from dimethylformamide. Melting point 251–252° C.

EXAMPLE 2

*2-(p-bromophenacyl)-5-chloro-6-sulfamoyl-saccharin*

In the same way as described in Example 1, however substituting p-bromophenacyl bromide for phenacyl bromide, 2-(p-bromophenacyl)-5-chloro-6-sulfamoyl-saccharin is obtained. Melting point 269–270° C.

EXAMPLE 3

*2-(2-oxo-2-cyclopentyl-ethyl)-5-chloro-6-sulfamoyl-saccharin*

A solution of 35.5 grams of 5-chloro-6-sulfamoyl-saccharin in 100 ml. of dimethylformamide is transformed into a solution of the monosodium salt of said saccharin with the aid of a 50% suspension of sodium hydride in mineral oil. Hereupon 17.6 grams of cyclopentylchloromethyl ketone are added and the mixture is heated for one hour between 120 and 130° C. After cooling, the mixture is poured into water and the precipitate formed is washed with water, dried, washed with petroleum ether and dried again. The 2-(2-oxo-2-cyclopentyl-ethyl)-5-chloro-6-sulfamoyl-saccharin obtained, is crystallized from acetic acid. Melting point 248–249° C.

EXAMPLE 4

*3-benzoyl-6-chloro-7-sulfamoyl-3,4-dihydro-1,2-benzothiazin-4-one-1,1-dioxide*

To a warm solution of 0.6 gram of sodium methylate in 4 ml. of absolute alcohol, 1.5 grams of 2-phenacyl-5-chloro-6-sulfamoyl-saccharin are added. The mixture is heated at 60° C. for 3 minutes and thereupon cooled to room temperature.

The deep-red solution is acidified with dilute hydrochloric acid till the color changes into yellow. By adding water to the mixture, the 3-benzoyl-6-chloro-7-sulfamoyl-3,4 - dihydro - 1,2-benzothiazin-4-one-1,1-dioxide formed precipitates. The compound is crystallized from n-butanol. Melting point 264° C.

EXAMPLE 5

*3-cyclopentylcarbonyl-6-chloro-7-sulfamoyl-3,4-dihydro-1,2-benzothiazin-4-one-1,1-dioxide*

A warm solution of 5.4 grams of sodium methylate in 40 ml. of absolute alcohol is poured onto 8.1 grams of 2 - (2 - oxo - 2 - cyclopentyl - ethyl) - 5 - chloro - 6 - sulfamoyl-saccharin, whereupon the mixture is heated to 60° C. for 3 minutes. After cooling, the solution is acidified by which the color changes from red to yellow. By pouring the mixture into water, a precipitate appears consisting of 3 - cyclopentylcarbonyl-6-chloro-7-sulfamoyl-3,4-dihydro-1,2-benzothiazin-4-one-1,1-dioxide. The compound is crystallized from aqueous methanol. Melting point 221–223° C.

EXAMPLE 6

*3-(trimethylacetyl)-6-chloro-7-sulfamoyl-3,4-dihydro-1,2-benzothiazin-4-one-1,1-dioxide*

To a solution of 1.0 gram of 2-(2-oxo-3,3-dimethylbutyl)-5-chloro-6-sulfamoyl-saccharin in 5 ml. of dimethylformamide is added with stirring 0.5 gram of sodium methylate. The temperature of the mixture increases and the mixture becomes dark in color. After some 15 minutes the mixture is poured into 50 ml. of water to which 3 ml. of 4 N hydrochloric acid had been added before. The yellow precipitate is crystallized from aqueous methanol, yielding pure 3-(trimethylacetyl)-6-chloro-7-sulfamoyl - 3,4 - dihydro - 1,2 - benzothiazin - 4 - one - 1,1-dioxide melting at 262° C.

EXAMPLE 7

*2-methyl-3-cyclopentylcarbonyl-6-chloro-7-sulfamoyl-3,4-dihydro-1,2-benzothiazin-4-one-1,1-dioxide*

To a solution of 2.1 grams of 3-cyclopentylcarbonyl-6-chloro - 7 - sulfamoyl - 3,4 - dihydro - 1,2 - benzothiazin-4-one-1,1-dioxide in 4 ml. of dimethylformamide are added 0.24 gram of a 50% suspension of sodium hydride in mineral oil. When the evolution of hydrogen has ended, 2 ml. of methyl iodide are added, whereupon the mixture is heated to about 35° C. for one hour.

The reaction mixture is poured into cold water and the precipitate consisting of 2-methyl-3-cyclopentylcarbonyl-6 - chloro - 7 - sulfamoyl - 3,4 - dihydro - 1,2 - benzothiazin-4-one-1,1-dioxide recrystallized from aqueous methanol.

Melting point 214–216° C.

EXAMPLE 8

*2-benzyl-3-acetyl-6-chloro-7-sulfamoyl-3,4-dihydro-1,2-benzothiazin-4-one-1,1-dioxide*

Into a mixture of 20 ml. of water and 2 ml. of 1 N aqueous sodium hydroxide, 0.70 gram of 3-acetyl-6-chloro-7-sulfamoyl-3,4-dihydro-1,2-benzothiazin-4-one - 1,1 - dioxide are dissolved, whereupon 0.25 ml. of benzyl chloride are added. The mixture is heated with stirring to 60° C. for 2 hours. After cooling, the solution is acidified with dilute hydrochloric acid. The precipitate formed is filtered off and recrystallized from a mixture of acetone and petroleum ether yielding pure 2-benzyl-3-acetyl-6-chloro-7-sulfamoyl-3,4-dihydro-1,2-benzothiazin-4-one - 1, 1-dioxide.

Melting point 242–243° C.

EXAMPLE 9

*2-methyl-3-propionyl-6-chloro-7-sulfamoyl-3,4-dihydro-1,2-benzothiazin-4-one-1,1-dioxide*

In the same way as described in Example 7, however, substituting 3-propionyl-6-chloro-7-sulfamoyl-3,4-dihydro-1,2-benzothiazin-4-one-1,1-dioxide for the 3-cyclopentylcarbonyl derivative, 2-methyl-3-propionyl-6-chloro-7-sulfamoyl-3,4-dihydro-1,2-benzothiazin-4-one-1,1 - dioxide is obtained.

Melting point 162–165° C.

EXAMPLE 10

*2-(2-oxopropyl)-5-chloro-6-sulfamoyl-saccharin*

In the same way as described in Example 1, however, substituting 2-oxopropyl bromide for phenacyl bromide, crude 2-(2-oxopropyl)-5-chloro-6-sulfamoyl-saccharin is obtained. The compound is crystallized from a mixture of acetone and petroleum ether.

Melting point 246–248° C.

EXAMPLE 11

*2-(2-oxoheptyl)-5-chloro-6-sulfamoyl-saccharin*

In the same way as described in Example 1, however, substituting 2-oxoheptyl chloride for phenacyl bromide, 2-(2-oxoheptyl)-5-chloro-6-sulfamoyl-saccharin is obtained. The crude compound is recrystallized from ethanol.

Melting point 203–207° C.

EXAMPLE 12

*3-isopropylcarbonyl-6-chloro-7-sulfamoyl-3,4-dihydro-1,2-benzothiazin-4-one-1,1-dioxide*

In the same way as described in Example 4, however, substituting 2-(2-oxo-3-methyl-butyl) - 5 - chloro - 6 - sulfamoyl-saccharin for the 2-phenacyl derivative, 3-isopropylcarbonyl-6-chloro-7-sulfamoyl-3,4 - dihydro - 1,2-benzothiazin-4-one-1,1-dioxide is obtained which is recrystallized from methanol.

Melting point 256–259° C.

EXAMPLE 13

*2-methyl-3-isopropylcarbonyl-6-chloro-7-sulfamoyl-3,4-dihydro-1,2-benzothiazin-4-one-1,1-dioxide*

In the same way as described in Example 7, however, substituting 3-isopropylcarbonyl-6-chloro-7-sulfamoyl-3,4-dihydro-1,2-benzothiazin-4-one-1,1-dioxide for the 3-cyclopentylcarbonyl derivative, 2-methyl-3-isopropylcarbonyl-6-chloro-7-sulfamoyl-3,4-dihydro-1,2 - benzothiazin-4-one-1,1-dioxide is obtained.

Melting point 170–171° C.

The other compounds mentioned in the tables have been prepared in the same way as specifically described above by substituting the suitable starting materials for those used in the foregoing examples.

TABLE I

The influence of substituted saccharin derivatives according to Formula II on the electrolyte and water excretion and on the pH of the urine by rats, after the oral administration of 15 mg./kg.

| Compound tested | Place and kind of the substituents | | | Effects measured | | | | |
|---|---|---|---|---|---|---|---|---|
| | R | 5 | 6 | Na | K | Cl | $H_2O$ | pH |
| 1 | $-C_6H_5$ | Cl | $SO_2NH_2$ | 0.8 | 0.4 | 1.0 | 6 | 0 |
| 2 | -⟨C₆H₄⟩-Br | Cl | $SO_2NH_2$ | −0.4 | −0.3 | −0.6 | 2 | 0.4 |
| 3 | $-C_2H_5$ | Cl | $SO_2NH_2$ | 1.5 | 0.1 | 1.6 | 7 | −0.1 |
| 4 | methylenedioxyphenyl | Cl | $SO_2NH_2$ | 0.2 | 0.0 | 0.0 | −2 | 0.0 |
| 5 | biphenyl | Cl | $SO_2NH_2$ | 0.0 | 0.0 | −0.2 | 1 | −0.3 |
| 6 | $-CH_3$ | Cl | $SO_2NH_2$ | 3.0 | 0.2 | 3.1 | 17 | −0.1 |
| 7 | $-C_3H_7$ | Cl | $SO_2NH_2$ | 2.0 | 0.0 | 2.1 | 10 | 0.1 |
| 8 | $-CH_3$ | Cl | H | −0.4 | 0.0 | −0.3 | −2 | −0.1 |
| 9 | $-C_4H_9$ | Cl | $SO_2NH_2$ | 2.1 | 0.4 | 2.7 | 12 | 0.1 |
| 10 | $-C_5H_{11}$ | Cl | $SO_2NH_2$ | 2.5 | 0.1 | 2.8 | 14 | −0.4 |
| 11 | $-(CH_2)_2-C_6H_5$ | Cl | $SO_2NH_2$ | 0.8 | 0.6 | 1.1 | 10 | 0.2 |
| 12 | $-CH_2$-cyclohexyl | Cl | $SO_2NH_2$ | 0.1 | 0.4 | 0.3 | 3 | 0.2 |
| 13 | $-CH_2-C_6H_5$ | Cl | $SO_2NH_2$ | 1.2 | 0.0 | 1.5 | 7 | 0.1 |
| 14 | $-CH(CH_3)_2$ | Cl | $SO_2NH_2$ | 1.2 | −0.1 | 1.4 | 3 | −0.2 |
| 15 | cyclopentyl | Cl | $SO_2NH_2$ | 2.1 | 0.3 | 2.5 | 12 | 0.0 |
| 16 | $-C(CH_3)_3$ | Cl | $SO_2NH_2$ | 2.0 | 0.2 | 2.1 | 12 | −0.2 |

TABLE II

The influence of substituted benzothiazine derivatives according to Formula III on the electrolyte and water excretion and on the pH of the urine by rats, after the oral administration of 15 mg./kg.

| Compound tested | Place and kind of the substituents | | | | Effects measured | | | | |
|---|---|---|---|---|---|---|---|---|---|
| | 2 | R= | 6 | 7 | Na | K | Cl | H₂O | pH |
| 1 | | —C₆H₅ | Cl | SO₂NH₂ | 4.3 | 0.9 | 4.8 | 28 | 0 |
| 2 | | —⟨⟩—Br | Cl | SO₂NH₂ | 3.2 | 0.4 | 3.9 | 16 | −0.5 |
| 3 | CH₃ | —⟨⟩—Br | Cl | SO₂NH₂ | 3.3 | 0.5 | 3.4 | 18 | 0.1 |
| 4 | | —C₂H₅ | Cl | SO₂NH₂ | 1.7 | 0.4 | 1.9 | 8 | −0.3 |
| 5 | CH₃ | —C₂H₅ | Cl | SO₂NH₂ | 6.5 | 1.3 | 6.2 | 38 | 1.3 |
| 6 | | benzodioxole-CH₂ | Cl | SO₂NH₂ | 0.5 | 0.2 | 0.5 | 1 | −0.1 |
| 7 | | biphenyl | Cl | SO₂NH₂ | −0.1 | −0.1 | −0.5 | 0 | −0.1 |
| 8 | CH₂—C₆H₅ | biphenyl | Cl | SO₂NH₂ | 0.4 | 0.2 | 0.2 | 1 | 0 |
| 9 | | —CH₃ | Cl | SO₂NH₂ | 0.5 | 0.2 | 0.7 | 3 | −0.1 |
| 10 | CH₂—C₆H₅ | —CH₃ | Cl | SO₂NH₂ | 1.2 | 0.3 | 1.3 | 7 | 0 |
| 11 | CH₃ | —CH₃ | Cl | SO₂NH₂ | 3.9 | 0.6 | 3.8 | 14 | 1.0 |
| 12 | C₂H₅ | —CH₃ | Cl | SO₂NH₂ | 3.9 | 0.9 | 3.8 | 21 | 1.2 |
| 13 | CH₃ | —C₆H₅ | Cl | SO₂NH₂ | 3.1 | 1.0 | 2.5 | 18 | 1.3 |
| 14 | C₃H₇ | —CH₃ | Cl | SO₂NH₂ | 0.4 | 0.3 | 0.2 | 2 | 0.8 |
| 15 | CH₂—CH=CH₂ | —CH₃ | Cl | SO₂NH₂ | 0.2 | 0.2 | 0.0 | 1 | 0.3 |
| 16 | CH₂—C≡C | —CH₃ | Cl | SO₂NH₂ | 0.3 | 0.1 | 0.5 | 3 | 0.1 |
| 17 | CH₂COCH₃ | —CH₃ | Cl | SO₂NH₂ | −0.1 | 0.0 | −0.1 | −1 | −0.1 |
| 18 | C₂H₅ | —C₂H₅ | Cl | SO₂NH₂ | 5.0 | 0.6 | 4.8 | 28 | 1.2 |
| 19 | | —C₃H₇ | Cl | SO₂NH₂ | 3.8 | 0.7 | 4.3 | 17 | 0.1 |
| 20 | CH₃ | —C₃H₇ | Cl | SO₂NH₂ | 6.6 | 1.7 | 6.0 | 36 | 1.4 |
| 21 | | —C₄H₉ | Cl | SO₂NH₂ | 4.7 | 0.8 | 5.4 | 26 | 0 |
| 22 | CH₃ | —C₄H₉ | Cl | SO₂NH₂ | 4.1 | 1.4 | 2.7 | 23 | 1.3 |
| 23 | | —C₅H₁₁ | Cl | SO₂NH₂ | 3.4 | 0.4 | 3.4 | 17 | 0.1 |
| 24 | CH₃ | —C₅H₁₁ | Cl | SO₂NH₂ | 2.6 | 0.8 | 1.5 | 11 | 2.2 |
| 25 | | —C₆H₁₃ | Cl | SO₂NH₂ | 0.8 | 0.2 | 0.8 | 3 | 0.7 |
| 26 | CH₃ | —C₆H₁₃ | Cl | SO₂NH₂ | 1.6 | 0.2 | 1.6 | 8 | 0.4 |
| 27 | | —C₈H₁₇ | Cl | SO₂NH₂ | 1.4 | 0.2 | 1.5 | 8 | 0.1 |
| 28 | CH₃ | —C₈H₁₇ | Cl | SO₂NH₂ | 2.1 | 0.4 | 2.1 | 16 | 0.6 |
| 29 | | —(CH₂)₂—C₆H₅ | Cl | SO₂NH₂ | 4.1 | 0.6 | 4.7 | 26 | 0.1 |
| 30 | | —CH₂—⟨⟩ | Cl | SO₂NH₂ | −0.3 | 0.2 | 0.4 | −4 | −0.2 |
| 31 | | —CH₂—C₆H₅ | Cl | SO₂NH₂ | 3.3 | 0.4 | 3.6 | 21 | −0.1 |
| 32 | CH₃ | —(CH₂)₂—C₆H₅ | Cl | SO₂NH₂ | 1.7 | 0.3 | 2.0 | 12 | −0.1 |
| 33 | | —CH₃ | Cl | H | −0.4 | 0.1 | −0.2 | 0 | 0 |
| 34 | CH₃ | —CH₃ | Cl | H | −0.7 | 0.1 | −0.6 | −4 | −0.3 |
| 35 | CH₃ | —CH₂—⟨⟩ | Cl | SO₂NH₂ | 2.2 | 0.6 | 1.2 | 11 | 1.3 |
| 36 | CH₃ | —CH₂—C₆H₅ | Cl | SO₂NH₂ | 2.5 | 0.8 | 2.1 | 19 | 1.2 |
| 37 | | —⟨⟩ | Cl | SO₂NH₂ | 4.2 | 0.1 | 4.1 | 22 | −0.1 |
| 38 | | —CH(CH₃)₂ | Cl | SO₂NH₂ | 1.9 | 0.3 | 2.0 | 12 | 0.2 |
| 39 | CH₃ | —CH(CH₃)₂ | Cl | SO₂NH₂ | 5.8 | 0.9 | 5.1 | 33 | 1.6 |
| 40 | | —⟨⟩ | Cl | SO₂NH₂ | 5.1 | 0.7 | 5.2 | 29 | 0.1 |
| 41 | CH₃ | —⟨⟩ | Cl | SO₂NH₂ | 1.3 | 0.1 | 1.3 | 6 | −0.2 |
| 42 | | —C(CH₃)₃ | Cl | SO₂NH₂ | 2.1 | 0.5 | 2.6 | 16 | 0.2 |
| 43 | CH₃ | —C(CH₃)₃ | Cl | SO₂NH₂ | 4.2 | 0.3 | 4.7 | 19 | −0.7 |

We claim:
1. A compound having the formula:

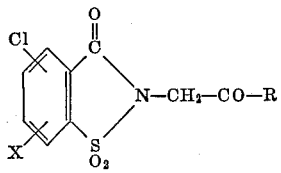

in which:
X is selected from the class consisting of hydrogen and the sulfamoyl group, and R is selected from the class consisting of alkyl having up to three carbon atoms, biphenylyl, phenyl substituted by halogen having a maximum atomic weight of 80, and 1,3-benzodioxole.

2. Compounds having the formula:

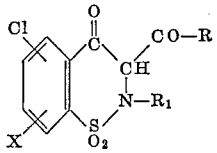

in which:
X is selected from the class consisting of hydrogen and the sulfamoyl group;
R is selected from the class consisting of alkyl having up to 12 carbon atoms, phenyl-lower-alkyl, phenyl, biphenylyl, phenyl subsituted by halogen having a maximum atomic weight of 80, phenyl substituted by a maximum of two aliphatic ether functions in which a maximum of 2 carbon atoms are involved, and cycloalkyl and cycloalkyl-alkyl containing up to 8 carbon atoms; and
$R_1$ is selected from the class consisting of hydrogen, and alkyl, alkenyl, alkynyl, aralkyl, and keto-substituted alkyl and aralkyl radicals, containing up to 9 carbon atoms.

3. 2-(2-oxopropyl)-5-chloro-6-sulfamoyl-saccharin.

4. 2 - methyl - 3 - propionyl - 6 - chloro - 7 - sulfamoyl-3,4-dihydro-1,2-benzothiazin-4-one-1,1-dioxide.

5. 2 - methyl - 3 - isopropylcarbonyl - 6 - chloro - 7-sulfamoyl - 3,4 - dihydro - 1,2 - benzothiazin - 4 - one-1,1-dioxide.

6. A method of preparing substituted saccharins having the formula:

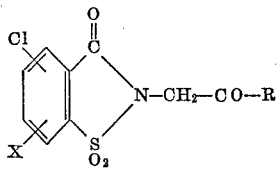

in which:
X is selected from the class consisting of hydrogen and the sulfamoyl group, and
R is selected from the class consisting of alkyl having up to 12 carbon atoms, phenyl-lower-alkyl, phenyl, biphenylyl, phenyl subsituted by halogen having a maximum atomic weight of 80, phenyl subsituted by a maximum of two aliphatic ether functions in which a maximum of 2 carbon atoms are involved, and cycloalkyl and cycloalkyl-alkyl containing up to 8 carbon atoms, comprising the steps of reacting a chloro-saccharin selected from the class consisting of unsubstituted and sulfamoyl substituted chloro-saccharin with a reactive ester of an alcohol of the formula HO—$CH_2$—CO—R, in which R has the above defined meaning, in the presence of a condensing agent.

7. In a method of preparing compounds according to the formula

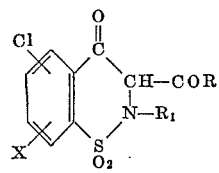

in which:
X is selected from the class consisting of hydrogen and sulfamoyl,
R is selected from the class consisting of alkyl having up to 12 carbon atoms, phenyl-lower-alkyl, phenyl, biphenylyl, phenyl substituted by halogen having a maximum atomic weight of 80, phenyl substituted by a maximum of two aliphatic ether functions in which a maximum of 2 carbon atoms are involved, and cycloalkyl and cycloalkyl-alkyl containing up to 8 carbon atoms, and
$R_1$ is selected from the class consisting of hydrogen, and alkyl, alkenyl, alkynyl, aralkyl, and keto-substituted alkyl and aralkyl radicals, containing up to 9 carbon atoms;
the step of recating an N-alkalimetal salt of 1,2-benzothiazinone of the formula

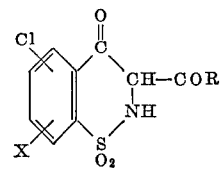

with a reactive ester of an alcohol of the formula $R_1OH$.

References Cited by the Examiner
UNITED STATES PATENTS

| | | | |
|---|---|---|---|
| 2,776,281 | 1/1957 | Wright | 260—243 |
| 2,957,883 | 10/1960 | Novello | 260—301 |
| 3,050,553 | 8/1962 | Novello | 260—301 |

OTHER REFERENCES
Abe et al.: J. Pharm. Soc. Japan, volume 76 (1956), pages 1058–63.

WALTER A. MODANCE, *Primary Examiner.*

J. M. FORD, *Assistant Examiner.*